United States Patent [19]
Lange et al.

[11] 4,396,650
[45] Aug. 2, 1983

[54] PRIMED INORGANIC SUBSTRATES OVERCOATED WITH CURABLE PROTECTIVE COMPOSITIONS

[75] Inventors: Roger W. Lange, Maplewood; Alek P. Szecsy, Inver Grove Heights, both of Minn.

[73] Assignee: Minnesota Mining and Manufacturing Company, St. Paul, Minn.

[21] Appl. No.: 385,790

[22] Filed: Jun. 7, 1982

Related U.S. Application Data

[62] Division of Ser. No. 265,467, May 20, 1981, Pat. No. 4,356,233.

[51] Int. Cl.³ .............................................. B05D 1/36
[52] U.S. Cl. .................................. 427/409; 427/53.1; 427/54.1; 427/407.1; 427/407.2; 427/410
[58] Field of Search ............... 427/409, 410, 407.1, 427/407.2, 53.1, 54.1

[56] References Cited

U.S. PATENT DOCUMENTS

| 2,721,855 | 10/1956 | Kin | 260/46.5 |
|---|---|---|---|
| 3,321,350 | 5/1967 | Fekete | 156/329 |
| 3,687,882 | 8/1972 | Bishop | 260/29.2 M |
| 3,779,991 | 12/1973 | Preston | 260/46.5 E |
| 3,794,556 | 2/1974 | Young | 161/206 |
| 3,817,905 | 6/1974 | Lerner et al. | 260/37 R |
| 4,042,749 | 9/1977 | Sandvig | 428/412 |
| 4,073,967 | 2/1978 | Sandvig | 427/44 |
| 4,084,021 | 4/1978 | Sandvig | 427/44 |
| 4,113,895 | 9/1978 | Watt et al. | 427/44 |
| 4,118,536 | 10/1978 | Beardsley et al. | 428/413 |

Primary Examiner—Thurman Page
Attorney, Agent, or Firm—Cruzan Alexander; Donald M. Sell; Lorraine R. Sherman

[57] ABSTRACT

Primer compositions for adhering overcoatings derived from in situ polymerizations of uncured monomers onto inorganic substrates are disclosed. These primer compositions comprise at least one non-amino- or non-amido-containing silane, at least one of certain metal esters, and preferably an acidic material. The overcoatings are derived from epoxy and vinyl monomers. The primed and overcoated substrates of the present invention provide articles having protective, decorative, or other functional surface layers.

3 Claims, No Drawings

PRIMED INORGANIC SUBSTRATES OVERCOATED WITH CURABLE PROTECTIVE COMPOSITIONS

This is a division of application Ser. No. 265,467 filed May 20, 1981, now U.S. Pat. No. 4,356,233.

TECHNICAL FIELD

This invention relates to a composition and method for priming inorganic substrates. In another aspect, it relates to a method for overcoating such primed substrates with a protective organic layer and to the layered structure resulting therefrom. In a further aspect, it relates to articles primed and overcoated with the compositions of the present invention.

BACKGROUND ART

Primers, which are compositions that promote the adhesion of overcoatings onto substrates, are known in the art. They are particularly useful in articles requiring that organic materials be bonded onto inorganic substrates. The strength of the interfacial bond formed in such constructions often determines the ultimate strength and utility of the articles.

Previous attempts have been made to overcoat aluminum and other metals with various substances, but the resulting adhesion of the overcoating is frequently less than is necessary for the desired use. U.S. Pat. No. 3,321,350 teaches that adhesion of a cured polysiloxane onto a solid material, e.g., aluminum, is improved if a primer containing an organosilane and a hydrolyzable titanium compound, some of which primers are within the scope of the primer compositions of the present invention, is first applied. It is taught in U.S. Pat. No. 3,794,556, that a primer composition comprising a mixture of a tetraalkoxysilane, or a partial hydrolyzate thereof, and a tetraalkyl titanate can be used to improve the adhesion of silicone elastomers to titanium metal and to polymerized substrates, such as cured epoxy surfaces and polyurethanes. However, it is not taught in the prior art how to adhere a coating that is polymerized in situ on aluminum or other inorganic substrates with a superior level of adhesion needed in certain applications.

Titanium compounds have been used in preparing durable coatings. U.S. Pat. No. 2,721,855 teaches that polymeric organosilicone compositions containing titanic acid esters adhere onto various substrates, such as electrical insulators. U.S. Pat. No. 3,779,991 discloses the incorporation of tetraalkyl titanates into polymeric materials having silicon and hydantoin moieties in the polymeric backbone, and the subsequent use of such materials as coatings for wire. A composition and method for enhancing bonding and protection of aluminum surfaces is disclosed in U.S. Pat. No. 3,687,882, wherein the adherent coating is derived from a cohydrolyzed composition of a diaminosubstituted silane and a titanate. Galvanic protection to metal surfaces coated with compositions containing hydrolyzed and condensed organosilanes with hydrolyzable titanate esters and zinc particulates is taught in U.S. Pat. No. 3,817,905.

Compositions comprising silanes and metal esters, some within the scope of the primer compositions of the present invention, have been disclosed in U.S. Pat. Nos. 4,042,749, 4,073,967, and 4,084,021 as useful abrasion or corrosion resistant coatings for soft surfaces, including aluminum. These are relatively thick coatings and they are not taught as useful primer compositions.

The prior art, however, does not teach the promotion of adhesion of polymerizable monomeric organic materials, such as epoxy or acrylic monomers, onto primed inorganic surfaces such as aluminum metal, preferably where the primer composition contains acidic material in addition to silanes and metal esters, nor does it teach the curing of monomeric organic coatings by in situ polymerization of the monomers coated onto the primed surfaces.

DISCLOSURE OF INVENTION

Briefly the present invention provides primer compositions for adhering coatings derived from in situ polymerizations of uncured monomers onto inorganic substrates. These primer compositions comprise at least one non-amino- or non-amido-containing silane and at least one of certain metal esters, and also preferably include acidic materials in these primer compositions.

The priming compositions of the present invention provide for the adherence onto inorganic substrates, such as metals, metal oxides, and ceramics, of overcoatings derived from in situ polymerization of monomeric organic compositions that are known in the art to adhere poorly to such substrates. The overcoating compositions which contain, for example, epoxy or vinyl monomers, are cured in situ by heat or radiation.

By "substrate" is meant an underlying support layer which can be the base layer or it can be a thin coating on the base layer.

The primed and overcoated substrates of the present invention provide articles having surfaces that are protected, for example, against weathering, or they may be painted or marked as desired.

DETAILED DESCRIPTION

The present invention provides in one embodiment a primer composition comprising:

a. one part by weight of a non-amino- or non-amido-containing silane of the formula $$[R^1]_m\text{—Si—}[R^2]_n \quad (1)$$

in which $R^1$ is an alkyl or cycloalkyl group that can be unsubstituted or substituted by an ethenyl, methethenyl, acryloxy, methacryloxy, epoxy, mercapto, or an isocyanato group, said substituted group having a total of two to ten carbon atoms and said unsubstituted group having a total of one to ten carbon atoms; $R^2$ is a hydrolyzable group selected from alkoxy groups having one to eight carbon atoms and acyloxy groups having two to eight carbon atoms; m is an integer from 1 to 3; n is an integer from 1 to 3, with the proviso that $m+n=4$;

b. 1 to 50 parts by weight of metal ester of the formula $$M[OR^3]_x \quad (2)$$

in which M is a metal selected from a group consisting of titanium, tantalum, zirconium, aluminum, and antimony; $R^3$ is an alkyl group having from one to eight carbon atoms, and x is equal to the number of valence bonds of M; and c. an acidic material.

The present invention also provides a layered structure on an inorganic substrate, e.g., metals, such as aluminum, steel or zinc, metal oxides of these metals, and ceramics, such as glass, but preferably on aluminum, which may be dead-soft (i.e., flexible, easily bent and which retains its shape) or vapor coated on another substrate, which preferably is primed with the above-mentioned acidic material-containing composition, although the above-mentioned primer composition gives satisfactory results with no acidic component present, and overcoated with an organic monomer composition which is subsequently cured. The monomer, which preferably is an epoxy or vinyl monomer or mixtures thereof, is blended with a suitable initiator or a latent polymerization agent. After being applied to the primed substrate, the monomer composition is then cured in situ by heat, radiation, or other appropriate means. The above-mentioned primer, which is heat curable, can be cured simultaneously with the monomer composition if heat is used, or it can be separately cured by heat before application of the monomer layer.

Preparation of the layered structure of the present invention involves two steps.

The first step is the primer preparation and application. This involves the simple mixing or blending at ambient conditions of the following ingredients: a suitable silane, a hydrolyzable metal ester (also called an alkoxide), a suitable solvent, such as ethanol, butanol, 2-ethylhexanol, acetone, or methylethyl ketone, but preferably isopropyl alcohol. Optionally, a minor amount of an acidic material is added. The primer is then applied onto an inorganic substrate such as a metal. It is desirable that the cured primer coating be very thin, i.e., 0.02 to 0.5 microns in thickness. One method of achieving such a thin coating is to use an amount of solvent in the range of 50 to 99 weight percent of the composition, preferably at least 90 weight percent being present.

Typically, after admixing or blending, this primer coating composition is then applied to an inorganic substrate. These primer coatings are preferably used shortly after they are prepared; however, they may be prepared and stored at room temperature or below for several weeks before application.

Non-amino- or non-amido-containing silanes represented by formula (1) above are those wherein $R^2$ is a hydrolyzable group selected from alkoxy groups having 1 to 8 carbon atoms and acyloxy groups having 2 to 8 carbon atoms and $R^1$ can be an unsubstituted alkyl or cycloalkyl group, for example, methyltriethoxysilane, octyltriethoxysilane and cyclohexyltrimethoxysilane (all available from Petrarch Systems Inc., Levittown, Pa.). Examples where $R^1$ contains ethenyl and methethenyl functionality are vinyltriacetoxysilane (Union Carbide Corp.), methylvinyldiethoxysilane (Petrarch Systems, Inc.), divinyldiethoxysilane (Petrarch Systems, Inc.), and gamma-methacryloxypropyltrimethoxysilane (Union Carbide Corp.). Examples where $R^1$ is a substituted epoxy, mercapto or isocyanato group are gamma-glycidoxypropyltrimethoxysilane (Union Carbide Corp.), beta-(3,4-epoxycyclohexyl)ethyltrimethoxysilane (Union Carbide Corp.), gamma-mercaptopropyltrimethoxysilane (Union Carbide Corp.), and gamma-isocyanatopropyltriethoxysilane (Petrarch Systems, Inc.). These silanes and some of the other useful silanes as known in the art, are given in Table IV. The silanes may be utilzed alone or as a mixture of silanes in the practice of the present invention. Gamma-methacryloxypropyltrimethoxysilane is the preferred reactive silane.

Metal esters which have been found useful in the practice of the present invention may be represented by the formula $M[OR^3]_x$, where M is a metal selected from the group consisting of titanium, tantalum, antimony, aluminum, and zirconium, and $R^3$ is selected from the group consisting of lower alkyl groups containing from 1 to 8 carbon atoms which are bonded to the oxygen atom, and x is equal to the number of valence bonds of M.

Representative metal esters (some of which are shown in Table V, below) which have been found useful in the practice of the present invention include tetraisopropyl titanate (E. I. duPont de Nemours & Co., Inc.), tetrabutyl titanate (duPont), tetraethyl titanate (Alfa Products, Thiokol/Ventron Div., Danvers, Mass.), tetra-2-ethylhexyl titanate (duPont), and pentaethyl tantalate, aluminum isopropoxide, aluminum-s-butoxide, and tetra-n-propyl zirconate, (all available from Alfa Products). Each of the metal esters may be utilized by itself, or in a mixture of metal esters, in the practice of the present invention. Other useful metal esters of the type described are known to the art. The preferred metal ester is tetraisopropyl titanate.

It has been found that the molar ratio of metal ester to silane can vary. For example, in the primer compositions containing tetraisopropyl titanate (TPT) and gamma-methacryloxypropyltrimethoxysilane (GMPS), the useful, preferred, and most preferred ratios are summarized in Table I.

TABLE I

Utility of TPT and GMPS Reactive
Silane Primer Compositions on Aluminum

| Range of Utility | Ratio of TPT to GMPS | |
|---|---|---|
| | weight | mole* |
| Useful | 1:1–50:1 | 0.87:1–44:1 |
| Preferred | 1:1–20:1 | 0.87:1–18:1 |
| Most Preferred | 3:1–10:1 | 2.6:1–9:1 |

*molec. wt. TPT = 284.26; molec. wt. GMPS - 248.20

Energy is usually required to cure the primer coatings of the present invention. The preferred method of curing primer coatings of the present invention is exposure to heat.

While it is not necessary to incorporate an acidic material in the primer composition, it is desirable to do so. Acidic materials which can be added to the primer composition are such inorganic acids as nitric acid and sulfuric acid and such organic acidic materials as acetic acid, bis(perfluoromethylsulfonyl)methane (see U.S. Pat. No. 2,732,398), higher homologs of fluorinated sulfonylmethanes (see U.S. Pat. No. 3,281,472), and bis(perfluoromethylsulfonyl)phenylmethane (see U.S. Pat. No. 3,632,843). These acidic materials can be present in various concentration levels. The ratio of moles of inorganic acid to the sum of the mole quantities of titanate plus silane is 0:1 to 10:1, and preferably 0.5:1 to 4:1, and for the organic acidic materials the mole ratios are 0:1 to 20:1, and preferably 0.5:1 to 8:1. Priming effects can be achieved without acidic materials in the composition, but incorporation of acid makes a priming composition less subject to attack by moisture and allows for greater variability in the thickness of the primer layer.

The primer coating compositions used in this invention can be applied to a variety of inorganic substrates, such as steel, zinc, ceramics, but preferably the substrate is aluminum. Studies of metals used as substrates for the primer coatings are summarized in Table VI, below. The metal surfaces were first cleaned in a variety of ways (see Table VI), before the primer coatings were applied, to remove surface contamination. For example, aluminum was precleaned by 1.5 minute immersion in hot (60°-70° C.) aqueous 2.5% Oakite ® 166 solution (Oakite Products, Berkeley Heights, N.J.) followed by distilled water rinse, and air drying. The primer layer may be coated on a substrate by usual methods known in the art, e.g., bar, knife, reverse roll, knurled roll, or spin coating, or by dipping, spraying, or brushing. The cured primer coating is very thin, i.e., 0.02 to 0.5 microns in thickness.

The second step is the organic overcoating preparation which involves the simple mixing or blending of the ingredients of a suitable organic monomer with an initiator or a latent polymerization agent. Other additives such as leveling agents, diluents, colorants, fillers, viscosity modifiers, etc. may be added to the above formulation by simple mixing.

The method of preparation of the monomer overcoating composition involves the mixture of a suitable organic monomer, diluted or undiluted, a suitable solvent, such as acetone, fillers, colorants, additives, polymerization agents, initiators, and the like. Preferably, the latent polymerization agent or initiator is added last.

After blending, the overcoating composition is applied to the primer coating layer previously coated onto a suitable inorganic substrate, for example, aluminum. Preferably these overcoatings are used shortly after preparation, however, they may be stored if properly protected from heat and light for several months before application. More than one overcoating layer may be applied to the primed substrates. A variety of thicknesses for the overcoating layers is possible; the ultimate thickness allowable is determined by the properties of the cured overcoatings.

Monomers for overcoatings which have been found useful in the practice of this invention include epoxy resins such as bis(3,4-epoxycyclohexylmethyl) adipate (Union Carbide), and vinyl monomers such as trimethylolpropane triacrylate, hexanediol diacrylate, and pentaerythritol tetraacrylate (all are available from Sartomer Co.). Other vinyl monomers for overcoatings are 1,3-bis[3-(2,2,2-(triacryloxymethyl)ethoxy-2-hydroxypropyl]-5,5-dimethyl-2,4-imidazolidinedione and 1,3-bis[3-(2-acryloxyethoxy)-2-hydroxypropyl]-5,5-dimethyl-2,4-imidazolidinedione, (as disclosed in assignee's copending patent applications, U.S. Ser. No. 051,876 and U.S. Ser. No. 051,877, both filed on June 25, 1979). These monomers are film-forming monomers or prepolymers with a molecular weight up to 5,000, preferably up to 2,000, per polymerizable group.

Leveling agents are also useful in the overcoating composition in the practice of the invention in that they improve coating uniformity. Leveling agents which have been found useful in the practice of the present invention include fluorocarbon-based surfactants, "FC-430" and "FC-431" (3M). These agents are used in minor amounts, i.e., about 0.01% up to about 1% by weight.

Various methods may be employed to cure the overcoatings of the present invention. Epoxy monomers, such as bis(3,4-epoxycyclohexylmethyl) adipate can be cured, for example, with a photoactivatable epoxy cure initiator. Such photoactivatable epoxy cure initiators are generally known in the art and are described in a number of U.S. Pat. Nos. 4,219,377, 4,101,513, and 4,039,521. Triarylsulfoniumhexafluoroantimonate, disclosed in U.S. Pat. No. 4,173,476, is a particularly preferred photoactivatable epoxy cure initiator for use in the present invention, and it is usually present in an amount up to 2% by weight of the epoxy resin.

Vinyl monomer-containing overcoatings, typically with an appropriate latent polymerization agent present in the overcoating blend, can be cured by exposure to ultraviolet light or heat. Latent polymerization agents need not be present to effect curing of vinyl monomer-containing overcoatings via electron beam radiation. Free radical curing of vinyl monomers such as acrylates and methacrylates via ultraviolet light generally requires the presence of latent polymerization agents known as photoinitiators. One class of photoinitiators is acetophenone derivatives such as 2,2-dimethoxy-2-phenylacetophenone (Ciba-Geigy), and 2-hydroxy-2-methyl(3',4'-dimethyl)propiophenone (E. Merck) and are usually present in the overcoating in minor amounts. Other acetophenone derivatives are known in the art (see U.S. Pat. No. 3,715,293), e.g., 2-2-dimethoxyacetophenone, 2,2-diethoxyacetophenone, 2,2-dibutoxyacetophenone, 2,2-dihexoxyacetophenone, 2,2-diphenoxyacetophenone, 2,2-diphenoxy-2-ethylacetophenone, 2,2-diphenoxy-2-cyclopentylacetophenone.

Vinyl overcoating compositions containing free radical photoinitiators will cure when exposed to ultraviolet light. However, it is preferable that curing be conducted in an inert atmosphere such as nitrogen since oxygen inhibits the reaction. Monomeric overcoatings whose cure can be photoinitiated in the absence or presence of oxygen are those containing 1,3-bis[3-(2,2,2-(triacryloxymethyl)ethoxy-2-hydroxypropyl)]-5,5-dimethyl-2,4-imidazolidinedione and 1,3-bis[3-(2-acryloxyethoxy)-2-hydroxypropyl]-5,5-dimethyl-2,4-imidazolidinedione, mentioned above.

Any suitable source which emits ultraviolet light may be used to activate the photoinitiators in the practice of this invention. Suitable sources are mercury arcs, carbon arcs, low-, medium- and high-pressure mercury lamps, plasma arcs, ultraviolet light emitting diodes, and ultraviolet emitting lasers.

Ultraviolet light activation of the latent curing agents used in the overcoatings of this invention can be brought about with the use of such commercially available ultraviolet light sources as the UVEXS model LCU 750 (UVEXS, Inc., Sunnyvale, Calif.) and the RPC model QC 1202 ANIR (RPC Equipment, Plainfield, Ill.). Typical cure conditions with such ultraviolet light sources involve the conveying, or repeated conveying, of an overcoated substrate several centimeters from the source of a 200 watt per 2.54 cm medium pressure mercury lamp, at a suitable conveyor speed, for example, 15 meters/minute.

The overcoatings of the present invention, of which there may be one or more on the primed substrate, may be applied by methods known in the art, such as bar, knife, reverse roll, knurled roll, or spin coating, or by dipping, spraying, or brushing.

The evaluation of adhesion of the overcoating onto a primed inorganic substrate such as aluminum and other metals was conducted using two test methods, both of which were modeled after ASTM tests.

In the first test modeled after ASTM D3359 test method B, "Standard Methods for Measuring Adhesion by Tape Test," strips of Scotch ® Brand No. 250 Masking Tape or Scotch ® Brand No. 810 Magic Mending Tape (3M) were applied to a cross-cut section previously made in the overcoated substrate and the tape was then removed. The percent adhesion, that is, the amount (area) of coating remaining on the substrate was assessed on a 0–100 scale (see U.S. Pat. No. 4,042,749, col. 8, lines 23–40).

In a second test, modeled after ASTM D2197 test method B, "Standard Test Methods for Adhesion of Organic Coatings," using the parallel groove adhesion test, a point force of approximately 130 grams at the tip of a fixed carbide scribe was applied to a suitably coated substrate. The substrate was then moved beneath the scribe to produce a lined pattern through the coating. Adhesion was evaluated in terms of the closeness with which parallel scribed grooves could be cut through the coating before the film flakes or chips from the substrate. The better the adhesion, the closer together the grooves were cut before film failure (flaking or chipping) occurred.

The layered structures of the present invention find utility in articles that require adherent protective overcoatings, such as automotive trim, window frames, fireplace brick, or metal based tapes, and as pavement marking tapes wherein the overcoating layer has a top surface in which glass retroreflective microspheres and skid-resistant particles may be partially embedded in the surface. Other applications include applications which require decorative overcoatings.

The present invention will be more readily understood from a consideration of the following examples which are meant to illustrate, but not limit this invention. Parts and percentages are by weight unless otherwise indicated and temperatures are in degrees centigrade. In the following examples, primer coatings were applied to substrates using an RDS bar coater No. 3 and overcoatings were applied to primed surfaces using an RDS bar coater No. 14 (both coaters are available from R. D. Specialties Inc., Webster, N.Y.) unless indicated otherwise. Percent adhesion was measured using as a model ASTM D3359 test method B, unless indicated otherwise. In the examples using acids, i.e., conc. nitric acid (70%), acetic acid (glacial), conc. sulfuric acid (96%), each drop of acid contains 0.02 to 0.04 g acid.

EXAMPLES 1–12

The following is a model procedure for Examples 1–12. The results are summarized in Table II.

A primer composition was prepared by adding two drops of concentrated nitric acid to a solution of 19.6 g of isopropyl alcohol containing 0.4 g of gamma-methacryloxypropyltrimethoxysilane (GMPS) with 0.04 g of tetraisopropyl titanate (TPT). The resulting primer solution was coated onto a sample of #3003 aluminum alloy [precleaned by 1.5 minute immersion in hot (60°–70° C.) aqueous 2.5% Oakite 166 solution followed by distilled water rinse, then air dried]. The primer coating was cured for five minutes at 120° C. The primed aluminum was then overcoated with overcoating formulation A prepared by mixing 60 parts of 1,3-bis[3-(2,2,2-(triacryloxymethyl)ethoxy-2-hydroxypropyl)]-5,5-dimethyl-2,4-imidazolidinedione to 40 parts of 1,3-bis[3-(2-acryloxyethoxy)-2-hydroxypropyl]-5,5-dimethyl-2,4-imidazolidinedione to 2 parts of 2,2-dimethoxy-2-phenylacetophenone (Ciba-Geigy Corp., Ardsley, N.Y.) to 0.1 part of FC-430 to 100 parts acetone. This overcoating was cured photochemically by exposure of the overcoated substrate to ultraviolet light. The ultraviolet light source was a model LCU 750 200 watt/2.54 cm medium pressure mercury lamp (UVEXS, Sunnyvale, CA) which emitted short wavelength (200–320 nm) and long wavelength (320–430 nm) ultraviolet light. The coated substrate was placed on a conveyor and was passed under this ultraviolet light source three to four times at a conveyor speed of 15.2 meters per minute and at a distance of about 15 cm from this source.

The cured overcoating was then tested for adhesion using the ASTM D3359 test (cross hatch/tape pull test) using Scotch Brand No. 250 Masking Tape. The results using various ratios of GMPS to TPT for Examples 1–12 are given in Table II, and the range of utility was summarized in Table I, above.

TABLE II

| Ex. No.[a] | Adhesion of Overcoating A onto Primed Aluminum |||||||
|---|---|---|---|---|---|---|---|
| | Isopropyl Alcohol (g) | TPT (g) | GMPS (g) | Ti:Si Ratio (wt/wt) | Nitric Acid (Concentrated) (drops) | % Adhesion |  |
| | | | | | | Run No. 1 | Run No. 2 |
| 1 | 19.6 | — | 0.4 | Only Si | 2 | 80 | 10–70 |
| 2 | 19.6 | 0.04 | 0.4 | 1:10 | 2 | 20 | 60–70 |
| 3 | 19.6 | 0.06 | 0.36 | 1:6 | 2 | 20 | 10–40 |
| 4 | 19.6 | 0.1 | 0.3 | 1:3 | 2 | 10 | 20–40 |
| 5 | 19.6 | 0.2 | 0.2 | 1:1 | 2 | 80–85 | 50–80 |
| 6 | 19.6 | 0.3 | 0.1 | 3:1 | 2 | 95–100 | 100 |
| 7 | 19.6 | 0.36 | 0.06 | 6:1 | 2 | 95–100 | 100 |
| 8 | 19.6 | 0.4 | 0.04 | 10:1 | 2 | 95–100 | 100 |
| 9 | 39.2 | 0.8 | 0.04 | 20:1 | 4 | 75–90 | 95 |
| 10 | 78.4 | 1.6 | 0.04 | 40:1 | 8 | 40–70 | 80–85 |
| 11 | 19.6 | 0.4 | — | Ti Only | 2 | 65–70 | 40 |
| 12 | 19.6 | — | — | — | 2 | 0 | 0–5 |

[a]Ex. Nos. 1–4 and 11 and 12 are controls

The data show that adhesion of overcoating A onto primed aluminum was commercially useful when the weight ratio of TPT to GMPS was 1:1 to 50:1, the preferred ratio being 1:1 to 20:1, and the most preferred ratio being 3:1 to 10:1. These results were presented in TABLE I, above.

EXAMPLES 13–25

The following is a model procedure for Examples 13–25. The results are summarized in Table III.

A primer composition was prepared by adding one drop of concentrated nitric acid to a solution of 9.8 g isopropyl alcohol containing 0.2 g gamma-methacryloxypropyltrimethoxysilane with 0.2 g tetraisopropyl titanate. As in Examples 1–12, this solution was coated onto a sample of cleaned aluminum alloy #3003 (cleaned as indicated in Examples 1–12) and cured for five minutes at 120° C. The primed aluminum was then overcoated with coating formulation B prepared by mixing of 100 parts of 1,3-bis[3-(2,2,2-(triacryloxymethyl)ethoxy-2-hydroxypropyl)]-5,5-dimethyl-2,4- imidazolidinedione to 100 parts 2-butanone (methyl ethyl ketone) to 2 parts of 2-hydroxy-2-methyl(3',4'-dimethyl)propionphenone (E. Merck, Darmstadt, Germany) to 0.1 part FC-431 (3M). The cure of this overcoating composition was initiated photochemically, essentially following the procedure of Examples 1-12 wherein the ultraviolet light source was a 300 watt/2.54 cm mercury lamp (Model QC 1202 ANIR, RPC Equipment, Plainfield, Ill.). The coated substrate was placed on a conveyor and was exposed to this ultraviolet light source at a distance of about 15 cm and at a conveyor speed of 24.4 meters per minute.

The cured overcoating was then tested for adhesion using ASTM D3359 test B described above (cross hatch/tape pull test) using No. 810 Scotch Brand Magic Mending Tape. Results for Examples 13-25 are shown in Table III.

TABLE III

Adhesion of Overcoating B onto Primed Aluminum

| Ex. No.[b] | TPT (g) | GMPS (g) | Ti:Si Ratio (wt/wt) | % Adhesion |
|---|---|---|---|---|
| 13 | — | 0.2 | Only Si | 0 |
| 14 | 0.002 | 0.198 | 1:99 | 0 |
| 15 | 0.004 | 0.196 | 1:49 | 2 |
| 16 | 0.008 | 0.192 | 1:24 | 2 |
| 17 | 0.02 | 0.18 | 1:9 | 0 |
| 18 | 0.05 | 0.15 | 1:3 | 0 |
| 19 | 0.1 | 0.1 | 1:1 | 100 |
| 20 | 0.15 | 0.05 | 3:1 | 95 |
| 21 | 0.18 | 0.02 | 9:1 | 100 |
| 22 | 0.192 | 0.008 | 24:1 | 50 |
| 23 | 0.196 | 0.004 | 49:1 | 5 |
| 24 | 0.198 | 0.002 | 99:1 | 10 |
| 25 | 0.2 | 0.0 | Ti Only | 10 |

[b]Example Nos. 13-18 and 24 and 25 are controls.

The data of TABLE III show results similar to those of TABLE II. Compositions within the invention (i.e., Ex. Nos. 19-23) generally show better adhesion than controls; especially good are those compositions with TPT:GMPS ratios within the preferred range of TABLE I, above.

EXAMPLES 26-45

Examples 26-45 evaluate different silanes used in formulations for primers on aluminum substrates, which were then overcoated with formulations A and B of Examples 1-25. Results are summarized in Table IV using the following procedural model.

A primer composition was prepared by adding one drop of concentrated nitric acid to a solution of 9.8 g isopropyl alcohol containing 0.15 g tetraisopropyl titanate and the corresponding weight of selected silane indicated in Table IV (the number of moles of silane was kept constant within limits of measurements). This composition was coated onto a sample of aluminum alloy #3003 (cleaned as described in Example 1) and then cured at 120° C. for five minutes. In one set of examples, the primed aluminum panel was then overcoated with the overcoating formulation A, and photochemically cured as described in Examples 1-12. Adhesion of the overcoating was evaluated using the ASTM D3359 test method B using Scotch Brand tapes previously mentioned and results of two runs are shown in the Acrylate Formulation columns of Table IV.

In a second set of examples, the primed aluminum panel, primed as described above, was then overcoated with an epoxy formulation in place of the acrylate formulations used in Examples 1-25. The epoxy formulation, which was made by adding 100 parts of epoxy resin, bis(3,4-epoxycyclohexylmethyl) adipate with 2 parts of photoactivatable epxoy cure initiator triarylsulfoniumhexafluoroantimonate (General Electric Co.) and 0.1 part of surfactant FC-430 in 100 parts of acetone, was overcoated onto the primed aluminum. The overcoating was cured via ultraviolet light photoinitiation as described above and adhesion of this epoxy overcoating was evaluated for two runs according to ASTM D3359 test method B using Scotch Brand tapes previously mentioned and summarized in the Epoxy Formulation columns of Table IV.

TABLE IV

Adhesion of Overcoated Primed Aluminum Using Various Silanes

| Ex. No.[g] | Silane Chemical Structure | wt. (g) | % Adhesion Acrylate Formulation[c] Run 1 | Run 2 | Epoxy Formulation Run 1 | Run 2 |
|---|---|---|---|---|---|---|
| 26 | $CH_2=C(CH_3)CO_2(CH_2)_3Si(OCH_3)_3$ | 0.05 | 95 | 90 | 100 | 100 |
| 27 | $CH_3Si(OCH_3)_3$ | 0.03 | 15 | 5 | 75 | 20 |
| 28 | $CH_3Si(OC_2H_5)_3$ | 0.04 | 0 | 0 | 100 | 50 |
| 29 | $(CH_3)_2Si(OC_2H_5)_2$ | 0.03 | 15 | 0 | 95 | 20 |
| 30 | $CH_3CH_2CH_2Si(OCH_3)_3$ | 0.03 | 5 | 5 | 100 | 100 |
| 31 | $CH_3CH_2CH_2Si(OC_2H_5)_3$ | 0.04 | 5 | 0 | 100 | 100 |
| 32 | $CH_2=CHSi(O_2CCH_3)_3$ | 0.05 | 85 | 5 | 95 | 90 |
| 33 | $CH_2=CHSi(OC_2H_5)_3$ | 0.04 | 80 | 20 | 100 | 95 |
| 34 | $(CH_2=CH)CH_3Si(OC_2H_5)_2$ | 0.03 | 80 | 0 | 100 | 25 |
| 35 | $(CH_2=CH)_2Si(OC_2H_5)_2$ | 0.03 | 90 | 0 | 100 | 20 |
| 36 | $(CH_2=CH)(CH_3)_2Si(OC_2H_5)$ | 0.03 | 20 | 5 | 95 | 25 |
| 37 | $CH_2\text{———}CHCH_2O(CH_2)_3Si(OCH_3)_3$ (epoxide) | 0.05 | — | — | 50,0–20[f] | — |
| 38 | (thiirane/oxathiane ring)–$(CH_2)_2Si(OCH_3)_3$ | 0.05 | — | — | 0,20–90[f] | — |
| 39 | $OCN(CH_2)_3Si(OC_2H_5)_3$ | 0.05 | 0 | 0 | 60 | 95 |
| 40 | $HS(CH_2)_3Si(OCH_3)_3$ | 0.04 | 100 | 20 | 100 | 100 |
| 41 | $CH_2=CHCONH(CH_2)_3Si(OC_2H_5)_3$ | 0.05 | 5 | 5 | — | — |
| 42 | $CH_2=C(CH_3)CONH(CH_2)_3Si(OC_2H_5)_3$ | 0.05 | 5 | 5 | — | — |

TABLE IV-continued

Adhesion of Overcoated Primed Aluminum Using Various Silanes

| Ex. No.[g] | Silane Chemical Structure | wt. (g) | Acrylate Formulation[c] Run 1 | Run 2 | Epoxy Formulation Run 1 | Run 2 |
|---|---|---|---|---|---|---|
| 43 | $HO_2CCH=CHCONH(CH_2)_3Si(OC_2H_5)_3$ | 0.07 | 0 | 0 | — | — |
| 44 | $H_2N(CH_2)_3Si(OC_2H_5)_3$ | 0.04 | 0 | 0 | 0 | 0 |
| 45 | $H_2N(CH_2)_2NH(CH_2)_3Si(OCH_3)_3$ [d,e] | 0.04 | 0 | 0 | 0 | 0 |

[c]Run 1 used formulation A (see Ex. 1–12) and Scotch Brand No. 250 Masking Tape in all adhesion tests; Run 2 used formulation B (see Ex. 13–25) and Scotch Brand No. 810 Magic Mending Tape in all adhesion tests
[d]See U.S. Pat. No. 3,687,882
[e]Nitric acid omitted
[f]Replicate runs
[g]Ex. Nos. 41–45 were controls The results of TABLE IV show that the control formulations of Examples 41–45, wherein the silanes contain amino or amido groups, do not perform as well as primers within the present invention. The formulation of Ex. No. 26 gave superior results.

EXAMPLES 46–52

Examples 46–52 illustrate some of the metal esters which have been evaluated as a constituent in the primer formulation. Results are given in Table V using the following procedural model.

A primer composition was prepared by adding one drop of concentrated nitric acid to a solution of 9.8 g isopropyl alcohol containing 0.05 g gamma-methacryloxypropyltrimethoxysilane with the corresponding weight of selected metal ester indicated in Table V. The weight of metal ester was selected so that the mole ratio of the ester to silane was in a preferred ratio of about 2.6:1 (see Table I). This composition was coated onto two samples of aluminum alloy #3003 (cleaned as indicated in Examples 1–12) which were then cured at 120° C. for five minutes. One of the primed panels was then overcoated with overcoating formulation A (see Examples 1–12) and one with overcoating formulation B (see Examples 13–25), and both were then photochemically cured as described above.

The effectiveness of the metal ester in the primer composition was then indirectly measured by evaluating the adhesion of the overcoating onto the respective primed aluminum panel. ASTM D3359 test method B used Scotch Brand tapes previously mentioned and the results are provided in Table V.

TABLE V

Adhesion of Overcoated Primed Aluminum Using Various Metal Esters

| Ex. No. | Metal Ester Structure | wt. (g) | % Adhesion Formulation A | B |
|---|---|---|---|---|
| 46 | $Ta(OC_2H_5)_5$ | 0.21 | 95–100 | 100 |
| 47 | $B(OC_2H_5)_3$ [g] | 0.08 | 0–10 | 0 |
| 48 | $Sb(n-OC_4H_9)_3$ [h] | 0.18 | 20–80 | 20 |
| 49 | $Zr(n-OC_3H_7)_4$ | 0.17 | 0–10 | 10 |
| 50 | $Zr(n-OC_4H_9)_4.n-C_4H_9OH$ | 0.24 | 10 | 10 |
| 51 | $Al(s-OC_4H_9)_3$ | 0.17 | 0–80 | 2 |
| 52 | $Ti(i-OC_3H_7)_4$ | 0.15 | 95–100 | 98 |

[g]control
[h]nitric acid omitted

The data of TABLE V show a range of priming capabilities observable upon use of different metal esters (alkoxides). Preferred, due to performance, price, and availability is $Ti(i-OC_3H_7)_4$.

EXAMPLES 53–57

Various metal substrates for the primer coatings and the organic overcoatings were evaluated and the results are summarized in Table VI. The following is a model for the procedure used.

Each pair of primer solutions in Examples 54–57 was coated onto clean sample panels of copper, steel, and zinc, and cured at 120° C. for five minutes. Primer solutions in corresponding overcoatings as prepared in Examples 1, 4, 6, 11, 13, 18, 20, and 25 refer to Examples 54, 55, 56, and 57 as described in TABLE VI. The adhesion of the overcoatings to the panels was evaluated in accordance with ASTM D3359 test B using Scotch Brand No. 250 Masking Tape for Run 1 and Scotch Brand No. 810 Magic Mending Tape for Run 2.

TABLE VI

Adhesion Studies of Overcoated, Primed Metals

| Ex. No.[l] | Primer Solution From Example No. Run 1 | Run 2 | Aluminum Run 1 | Run 2 | Copper[i] Run 1 | Run 2 | Steel[j] Run 1 | Run 2 | Zinc[k] Run 1 | Run 2 |
|---|---|---|---|---|---|---|---|---|---|---|
| 53 | No primer | | 0 | 0–5 | 0 | 0 | 0 | 0 | 0 | 0 |
| 54 | 1 | 13 | 80 | 10–70 | 0 | 5 | 0–5 | 10 | 10 | 0 |
| 55 | 4 | 18 | 10 | 20–40 | 10 | 0 | 0 | 0 | 10 | 0 |
| 56 | 6 | 20 | 95–100 | 100 | 0 | 0 | 95 | 0 | 10–20 | 70 |
| 57 | 11 | 25 | 65–70 | 40 | 5 | 0 | 0 | 0 | 0 | 0 |

[i]Cleaned using ASTM method B281A 1.5
[j]Cleaned by acetone rinse, then wiped, then acetone rinsed, and air dried
[k]Cleaned by 1 min. immersion in 0.3% hydrochloric acid followed by distilled water rinse, then air dried
[l]Ex. Nos. 53, 54, 55, and 57 were controls Results of TABLE VI show that the formulation of Ex. No. 56, within the present invention, gave better to superior results to controls on all substrates evaluated, except copper.

EXAMPLES 58–60

The application of three different acrylic monomer based overcoatings onto primed aluminum is illustrated by Examples 58–60 with details and adhesion results reported in Table VII. In each case, the most preferred (i.e., Ti:Si ratio of 3:1) primer composition of Example 20 was coated onto panels of cleaned aluminum alloy #3003 and cured at 120° C. for five minutes. The panel was overcoated (see Table VII) with the respective acrylate formulation which contained one drop of 10% FC 431 surfactant in acetone plus the indicated amount of photoinitiator (i.e., 2-hydroxy-2-methyl(3',4'-dimethyl)propiophenone, HMDP. The overcoating was cured by the photoinitiation technique and adhesion was evaluated according to ASTM D3359 test method B using Scotch Brand No. 810 Magic Mending Tape.

TABLE VII

| | Adhesion of Acrylates onto Primed Aluminum | | | | |
|---|---|---|---|---|---|
| Ex. No. | Monomer | Acetone (g) | Photoinitiator HMDP | RDS Coater Bar No. | % Adhesion |
| 58 | Trimethylolpropane triacrylate (1.5 g) | 0.5 | 0.03 g | 8 | 100 |
| 59 | Hexanediol diacrylate (1.0 g) | — | 0.02 g | 3 | 95 |
| 60 | Pentaerythritol tetraacrylate (1.0 g) | 1.0 | 0.02 g | 14 | 100 |

The results of TABLE VII show that all three cured monomer coatings adhered very well to the primed aluminum.

EXAMPLES 61–76

The percent adhesion of primed, overcoated aluminum wherein no acidic material was incorporated into the primer formulation is shown in the data of Examples 61–64 of Table VIII, while the percent adhesion using various acidic materials incorporated into the primer formulation is given in the data of Examples 65–76 of Table VIII. Two curing temperatures (90° C. and 150° C.) and two curing times (5 minutes and 10 minutes) are reported. The following procedure was the model for the examples in Table VIII.

A primer coating composition, prepared by adding 0.03 g of acidic material to a solution of 9.8 g of isopropyl alcohol containing 0.1 g of tetrapropyl titanate with 0.1 g of gamma-methacryloxypropyltrimethoxysilane was coated onto aluminum as described in Example 1 and cured at 90° C. for five minutes. The primed panel was then overcoated with the overcoating formulation A (see Example 1) and photochemically cured as described in Example 1. Adhesion was evaluated according to model ASTM D3359 test method B using Scotch Brand No. 810 Magic Mending Tape. Results are shown in Table VIII.

TABLE VIII

| Adhesion of Overcoated Primed Aluminum Using Acidic Materials | | | |
|---|---|---|---|
| Ex. No. | Acidic Material | Primer Cure Conditions | | |
| | | Temp. (°C.) | Time (min.) | % Adhesion |
| 61 | None | 90 | 5 | 20 |
| 62 | " | 90 | 10 | 0 |
| 63 | " | 150 | 5 | 80 |
| 64 | " | 150 | 10 | 0 |
| 65 | Nitric acid | 90 | 5 | 20 |

TABLE VIII-continued

| Adhesion of Overcoated Primed Aluminum Using Acidic Materials | | | |
|---|---|---|---|
| Ex. No. | Acidic Material | Primer Cure Conditions | | |
| | | Temp. (°C.) | Time (min.) | % Adhesion |
| 66 | " | 90 | 10 | 100 |
| 67 | " | 150 | 5 | 95 |
| 68 | " | 150 | 10 | 100 |
| 69 | Sulfuric acid | 90 | 5 | 95 |
| 70 | " | 90 | 10 | 100 |
| 71 | " | 150 | 5 | 100 |
| 72 | " | 150 | 10 | 100 |
| 73 | PDS[m] | 90 | 5 | 15 |
| 74 | " | 90 | 10 | 100 |
| 75 | " | 150 | 5 | 95 |
| 76 | " | 150 | 10 | 100 |

[m] PDS = bis(perfluoromethylsulfonyl)phenylmethane (see U.S. Pat. No. 3,632,843)

The data of TABLE VIII show that acidic material is not required in the primer compositions of the present invention; however, it is preferred and more consistent results are obtainable when acid is used.

EXAMPLES 77–87

The percent adhesion of unprimed and primed overcoated aluminum wherein different concentrations of nitric acid and acetic acid were used in the primer formulation is summarized in TABLE IX. The following procedure is a model for Examples 77–87.

A primer coating composition, prepared by adding the specified amount of acid, as indicated in the corresponding example of TABLE IX, to a solution of 9.8 g of isopropyl alcohol containing 0.15 g of tetraisopropyl titanate with 0.05 g gamma-methacryloxypropyltrimethoxysilane, was coated onto cleaned aluminum as described in Examples 13–25 and cured at 120° C. for five minutes. The primed panel was then overcoated with overcoating formulation B and photochemically cured as described in Examples 13–25. Adhesion was evaluated according to model ASTM D3359 test method B using Scotch Brand No. 810 Magic Mending Tape. The results are summarized in TABLE IX.

TABLE IX

| Use of Varying Concentrations of Acid in Adhesion of Overcoated, Primed Aluminum | | | | |
|---|---|---|---|---|
| Ex. No. | Acid | Wt. (g) | Ratio of moles acid to moles (titanate + silane) | % Adhesion |
| 77[n] | — | — | — | 0 |
| 78 | — | — | — | 95 |
| 79 | Nitric | 0.06 | 0.9 | 100 |
| 80 | Nitric | 0.12 | 1.8 | 100 |
| 81 | Nitric | 0.24 | 3.6 | 100 |
| 82 | Nitric | 0.48 | 7.3 | 80 |
| 83 | Acetic | 0.06 | 1.4 | 95 |
| 84 | Acetic | 0.12 | 2.7 | 75 |
| 85 | Acetic | 0.24 | 5.5 | 80 |
| 86 | Acetic | 0.48 | 11.0 | 100 |
| 87 | Acetic | 0.96 | 22.0 | 50 |

[n] no primer used (control)

The results of TABLE IX show that, within limits, varying the amount of acidic material in the primer composition does not deleteriously affect adhesion. It was useful to have a ratio of moles of inorganic acid to the sum of mole quantities of titanate plus silane that were 0:1 to 10:1, preferably 0.5:1 to 4:1, and for the organic acidic materials, the useful mole ratios were 0:1 to 20:1, and preferably 0.5:1 to 8:1.

EXAMPLE 88

Modified ASTM D 2197 Test Method B mentioned above was used in this example. Primed (as in Example 6) and non-primed aluminum panels were overcoated with formulation A (see Examples 1-12) modified to include about 0.05% of Brillant Yellow fluorescent indicator (Aldrich Chemical Co., Milwaukee, WI) for visual purposes. Each panel was placed under the tip of a carbide scribe to which a force of about 130 g was applied. Each panel was then mechanically moved beneath this scribe to provide a line through the overcoating. A second line, parallel to and 0.25 mm away from the first line, was similarly scribed. The overcoating between these two scribed lines remained intact on the primed panel but flaked off from the non-primed panel, indicating a failure of the overcoating to adhere to the non-primed substrate.

Various modifications and alterations of this invention will become apparent to those skilled in the art without departing from the scope and spirit of this invention, and it should be understood that this invention is not to be unduly limited to the illustrative embodiments set forth herein.

We claim:

1. A method for preparing a layered structure comprising the steps of:
   a. providing a substrate selected from a metal, metal oxide, or ceramic,
   b. coating at least one surface of said substrate with a primer composition comprising:
      (1) one part by weight of a non-amino- or non-amido-containing silane of the formula $$[R^1]_m-Si-[R^2]_n \qquad (1)$$

in which $R^1$ is an alkyl or cycloalkyl group that can be unsubstituted or substituted by an ethenyl, methethenyl, acryloxy, methacryloxy, epoxy, mercapto, or an isocyanato group, said substituted group having a total of two to ten carbon atoms and said unsubstituted group having a total of one to eight carbon atoms; $R^2$ is a hydrolyzable group selected from alkoxy groups having one to eight carbon atoms and acyloxy groups having two to eight carbon atoms; m is an integer from 1 to 3; n is an integer from 1 to 3, with the proviso that $m+n=4$;
      (2) 1 to 50 parts by weight of metal ester of the formula $$M[OR^3]_x \qquad (2)$$

in which M is a metal selected from a group comprising titanium, tantalum, zirconium, aluminum, and antimonyl; $R^3$ is an alkyl group having from one to eight carbon atoms; and x is equal to the number of valence bonds of M;
      (3) 0.5:1 to 4:1 moles by weight of an inorganic acidic material, or 0.5:1 to 8:1 moles by weight of an organic acidic material, compared to the total moles by weight of metal ester plus silane; and
      (4) an amount of solvent consisting essentially of organic solvent sufficient to provide for blending of the components of said primer composition;
   c. overcoating said primer composition with at least one layer of an uncured organic monomer composition, said monomer selected from epoxy and vinyl monomers, and
   d. curing said organic composition.

2. The method according to claim 1 wherein said primer composition is cured previous to or at the time of curing of said monomer composition.

3. The method according to claim 1 wherein said solvent in the primer composition is selected from isopropyl alcohol, ethanol, butanol, 2-ethylhexanol, acetone, and methyl ethyl ketone.

* * * * *